United States Patent
Tenghamn

(10) Patent No.: US 10,088,589 B2
(45) Date of Patent: Oct. 2, 2018

(54) METHOD AND SYSTEM OF GEOPHYSICAL SURVEYS IN MARINE ENVIRONMENTS

(71) Applicant: PGS Geophysical AS, Lysaker (NO)

(72) Inventor: Stig Rune Lennart Tenghamn, Katy, TX (US)

(73) Assignee: PGS Geophysical AS, Oslo (NO)

( * ) Notice: Subject to any disclaimer, the term of this patent is extended or adjusted under 35 U.S.C. 154(b) by 1325 days.

(21) Appl. No.: 13/691,946

(22) Filed: Dec. 3, 2012

(65) Prior Publication Data
US 2014/0153362 A1    Jun. 5, 2014

(51) Int. Cl.
G01V 1/38    (2006.01)
G01V 1/20    (2006.01)

(52) U.S. Cl.
CPC ............ G01V 1/3852 (2013.01); G01V 1/201 (2013.01); G01V 1/202 (2013.01); *G01V 1/3808* (2013.01)

(58) Field of Classification Search
CPC ......... G01V 1/38; G01V 1/201; G01V 1/3808
USPC .............................................. 367/20, 76, 154
See application file for complete search history.

(56) References Cited

U.S. PATENT DOCUMENTS

| | | | | |
|---|---|---|---|---|
| 4,375,089 A * | 2/1983 | Thigpen | ............... | G01V 1/3835 367/154 |
| 4,912,684 A * | 3/1990 | Fowler | ..................... | G01V 1/22 367/76 |
| 5,200,930 A * | 4/1993 | Rouquette | ................ | G01V 1/22 367/76 |
| 6,091,670 A | 7/2000 | Oliver et al. | | |
| 6,271,767 B1 | 8/2001 | Frye et al. | | |
| 6,292,436 B1 * | 9/2001 | Rau | ....................... | G01V 1/3826 114/245 |
| 6,842,006 B2 | 1/2005 | Conti et al. | | |
| 7,206,254 B2 | 4/2007 | Oliver et al. | | |
| 7,633,296 B2 | 12/2009 | Safinya et al. | | |
| 8,077,542 B2 | 12/2011 | Gulbransen et al. | | |
| 2008/0048881 A1 | 2/2008 | Safinya et al. | | |
| 2008/0310298 A1 | 12/2008 | Drange | | |
| 2011/0058814 A1 | 3/2011 | Camilli et al. | | |

OTHER PUBLICATIONS

Bilal, O. et al. Design of Broadband Coupling Circuits for Power-Line Communication. Communications Laboratory: Helsinki University of Technology. 2001.

(Continued)

*Primary Examiner* — Ian J Lobo

(57) ABSTRACT

Geophysical surveys in marine environments. At least some of the illustrative embodiments are methods including: attaching a first sensor module to a sensor cable having an outer jacket, the first sensor module electrically isolated from an electrical conductor disposed within the outer jacket of the sensor cable; attaching a second sensor module to the sensor cable, the second sensor module electrically isolated from an electrical conductor disposed within the outer jacket of the sensor cable; placing the sensor cable and the sensor modules onto a sea floor; communicating with the sensor modules by way of the electrical conductor disposed within the outer jacket; collecting geophysical data by the first and second sensor modules while the sensor cable is on the sea floor; and downloading to a computer system geophysical data from the first and second sensor modules.

20 Claims, 7 Drawing Sheets

(56) References Cited

OTHER PUBLICATIONS

Office Action for Australian Patent Application No. 2013257390 dated Nov. 30, 2017; 4 pages.
Office Action for Australian Patent Application No. 2013257390 dated Sep. 19, 2017; 4 pages.
Office Action for Australian Patent Application No. 2013257390 dated Jun. 20, 2017; 4 pages.
Office Action for Australian Patent Application No. 2013257390, dated Feb. 7, 2017.
Mexican patent application No. MX/a/2013/014158 Office Action dated Jan. 21, 2016.
Office Action for Mexican Patent Application No. MX/a/2013/014158, dated Jul. 7, 2016.

* cited by examiner

METHOD AND SYSTEM OF GEOPHYSICAL SURVEYS IN MARINE ENVIRONMENTS

BACKGROUND

Geophysical surveying is a technique where three-dimensional geophysical "pictures" of the state of an underground formation are taken with the use of energy (e.g., acoustic, electromagnetic, etc.) that penetrates the underground formation. Geophysical surveying takes place not only on land, but also in marine environments. Marine-based geophysical surveying faces significant challenges that are not faced by land-based surveying systems.

BRIEF DESCRIPTION OF THE DRAWINGS

For a detailed description of exemplary embodiments, reference will now be made to the accompanying drawings in which.

NOTATION AND NOMENCLATURE

Figure 1:
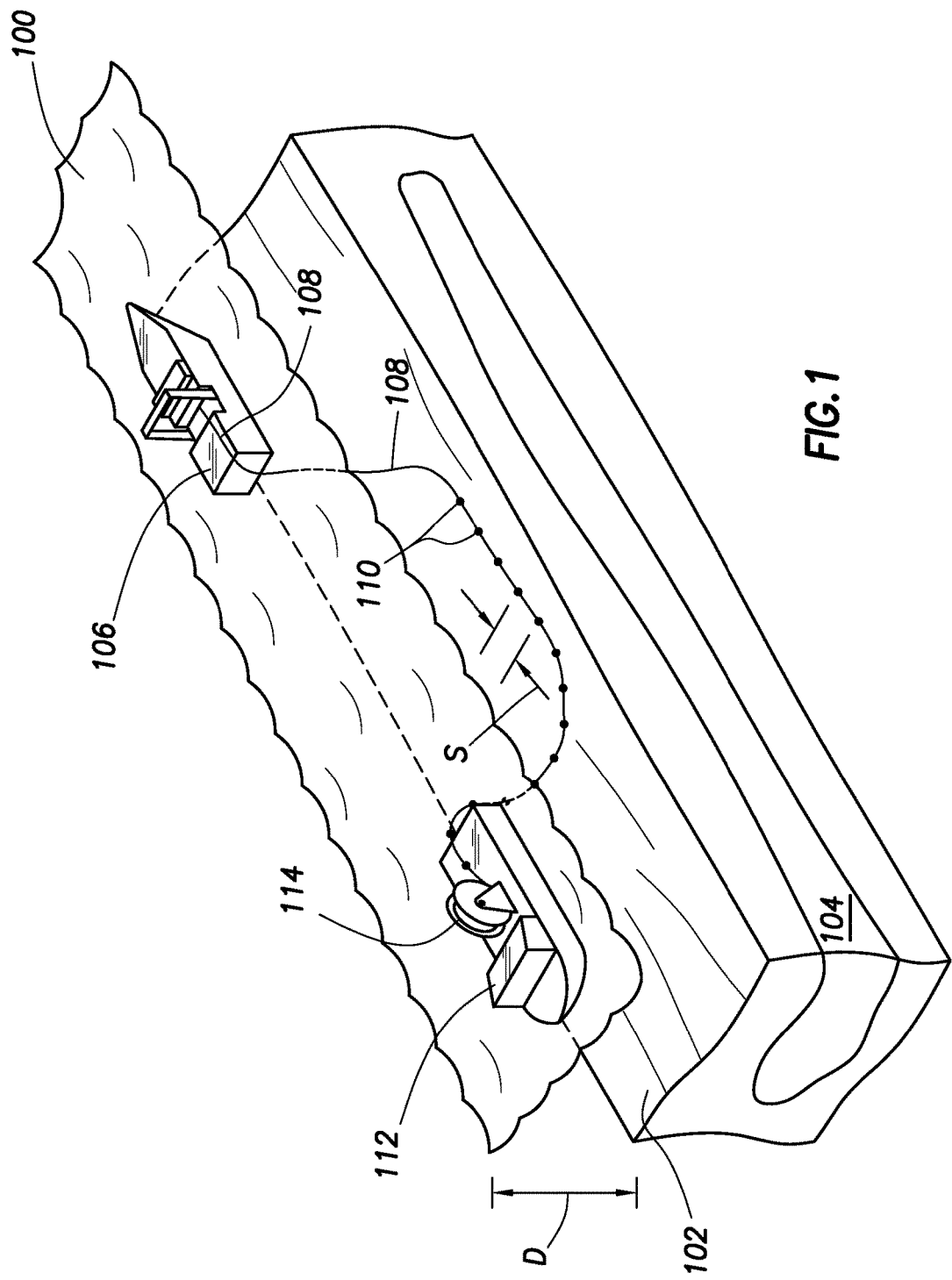
FIG. 1 shows a perspective cut-away view of a geophysical survey conducted in a marine environment in accordance with at least some embodiments.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Releasably coupled" shall mean that a first device mechanically couples to a second device in such a way that the first device can be mechanically detached from the second device without damage to or disassembly of either device or intermediate devices. Devices coupled such that detachment requires cutting, breaking, deforming, damaging, or disassembly shall not be considered to be releasably coupled.

"Marine environment" shall mean an underwater location regardless of the salinity of the water. Thus, even an underwater location in a body of fresh water shall be considered a marine environment.

"Sea floor" shall mean the boundary of a body of water and the underlying sediment or rock. The term sea floor shall not imply anything regarding the salinity of the water, and thus even the boundary of a body of fresh water and the underlying sediment or rock shall be considered a sea floor.

"On the sea floor" shall mean either in direct contact with, or no more than about 50 feet above the sea floor.

"Surface" in relation to the top of a body of water shall mean any location 100 feet below mean sea level and above.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

Various example systems and methods are directed to geophysical surveying in marine environments where the sensors used for the geophysical surveying (e.g., geophones, hydrophones, accelerometers, electrodes, magnetometers) are stationary and are placed on or near the sea floor. More particularly still, at least some of the various embodiments are systems where a distance between sensors along a sensor cable can be selected prior to deployment. The specification first turns to illustrative systems to orient the reader, and then to specifics regarding installation and use of the example systems.

FIG. 1 shows a perspective cut-away view of a portion of a marine environment showing deployment of sensors for a marine-based geophysical survey. In particular, FIG. 1 shows the surface 100 of the water. At a distance D below the surface 100 resides the sea floor 102, and below the sea floor 102 resides a subsurface formation of interest, illustratively a hydrocarbon reservoir 104. In some locations the precise depth of the sea floor 102 is easily discernible, such as in locations where the sea floor is defined by a rock layer. In other locations, the sea floor 102 may be defined by a layer of silt, sand, mud, and/or organic material that has increasing density with increase depth, starting from a density approximately the same as the surrounding water. Thus, the precise depth where the sea floor 102 begins may be harder to quantify in some cases.

Within the example environment of FIG. 1 resides a stationary vessel 106, illustratively shown as a boat. The example stationary vessel 106 may remain in place based on one or more anchors (not specifically shown), or the stationary vessel 106 may be dynamically positioned to remain at a particular location. Communicatively coupled to a computer system on the stationary vessel 106 is a sensor cable 108 that extends from the stationary vessel 106 to the sea floor 102. In other example system, the stationary vessel may be a buoy coupled to the sensor cable 108, and also communicatively coupled to land-based computer (e.g., communicatively coupled by satellite or point-to-point wireless transmission). The sensor cable 108 comprises a plurality of sensor modules (e.g., sensor modules 110) that are associated with the sensors appropriate for the geophysical survey, such as hydrophones, goephones, accelerometers, electrodes, and/or magnetometers.

In order to place the sensor cable 108 (and sensor modules 110) on the sea floor 102, a work vessel 112 may hold the sensor cable on a deployment device 114, illustratively shown as a reel structure around which the sensor cable 108 may be spooled. The work vessel 112 may sail away from the stationary vessel 106 while simultaneously feeding the sensor cable 108 off the deployment device 114, with the sensor cable 108 ultimately coming to rest on the sea floor. The example system of FIG. 1 shows sensor cable 108 extending in a straight line away from the stationary vessel 106, but such is merely an example, the work vessel 112 may lay the sensor cable in any suitable pattern relative to the location of the stationary vessel 106. By precise measurement of the location and speed of the work vessel, and knowledge of the distance between the sensor modules and the depth of the water, the location of each sensor module may be accurately determined. In yet still other example systems, the sensor cable 108 may be deployed by a remotely operated vehicle (ROV) or an autonomously operated vehicle (AOV) which deploys the sensor cable 108, and communicates with the various sensor modules 110.

Regardless of the precise deployment mechanism, once the sensor cable 108 (and in some cases other sensor cables not specifically shown) has been deployed to the sea floor 102, a geophysical survey may take place by release of energy (e.g., by way of an air gun, vibrator, antenna, or magnetic coil) within the water. Measurement of signals that return to the sensor modules after reflection from one or more features below the sea floor are recorded by the sensor modules 110, such as reflections of the acoustic or electromagnetic energy from the hydrocarbon bearing reservoir 104. After the geophysical survey is complete, the example sensor cable 108 may be retrieved, either by the work vessel 114 or by the stationary vessel 106. The system of FIG. 1 is merely an example to orient the reader. Many variations regarding deployment of one or more sensor cables to the sea floor are possible, and thus the example system of FIG. 1 should not be read to restrict possible deployment scenarios to just the example system shown.

There are a host of parameters associated with geophysical surveys that may be selected and/or adjusted for any particular situation. For example, the physical location at which the energy is released may be selected to achieve particular goals for the geophysical survey. The strength of the energy release may be adjusted (e.g., the strength of the energy release may be adjusted as a function of depth of the hydrocarbon bearing formation 104 beneath the sea floor 102). The pattern of the sensor cable 108 along the sea floor 102 may be selected to meet particular needs of the survey (e.g., expansive pattern for exploratory surveys, and a dense pattern for determining particular properties about a known hydrocarbon reservoir). Further still, the spacing "S" between the sensor modules may be selected to achieve certain goals (e.g., surveys of shallow hydrocarbon reservoirs may use close spacing, while surveys of deep hydrocarbon reservoirs may use extended spacing).

In the related-art, the spacing between sensor modules is controlled by the sensor cable. That is, in the related-art the overall sensor cable is divided into a plurality of sensor cable portions, where each sensor cable portion has a connector on each end. A connector is an electrical and/or optical coupling device configured for use in marine environments. An overall sensor cable is constructed by coupling sensor modules in series between sensor cable portions by way of the connectors. Thus, the overall sensor cable may be constructed one piece at a time, with the spacing between modules dictated by the lengths of the sensor cable portions.

The related-art sensor cables have limitations and/or shortcomings. If a different spacing between sensor modules is desired, a completely different sensor cable (having shorter or longer sensor cable portion lengths) is used. Moreover, each connector represents a discontinuity in the outer jacket of the sensor cable where water encroachment and mechanical failure are more likely to occur. Moreover, by connecting sensor modules and sensor cable portions in series, the sensor modules themselves may carry mechanical load (i.e., tension) during deployment and retrieval.

Figure 2:
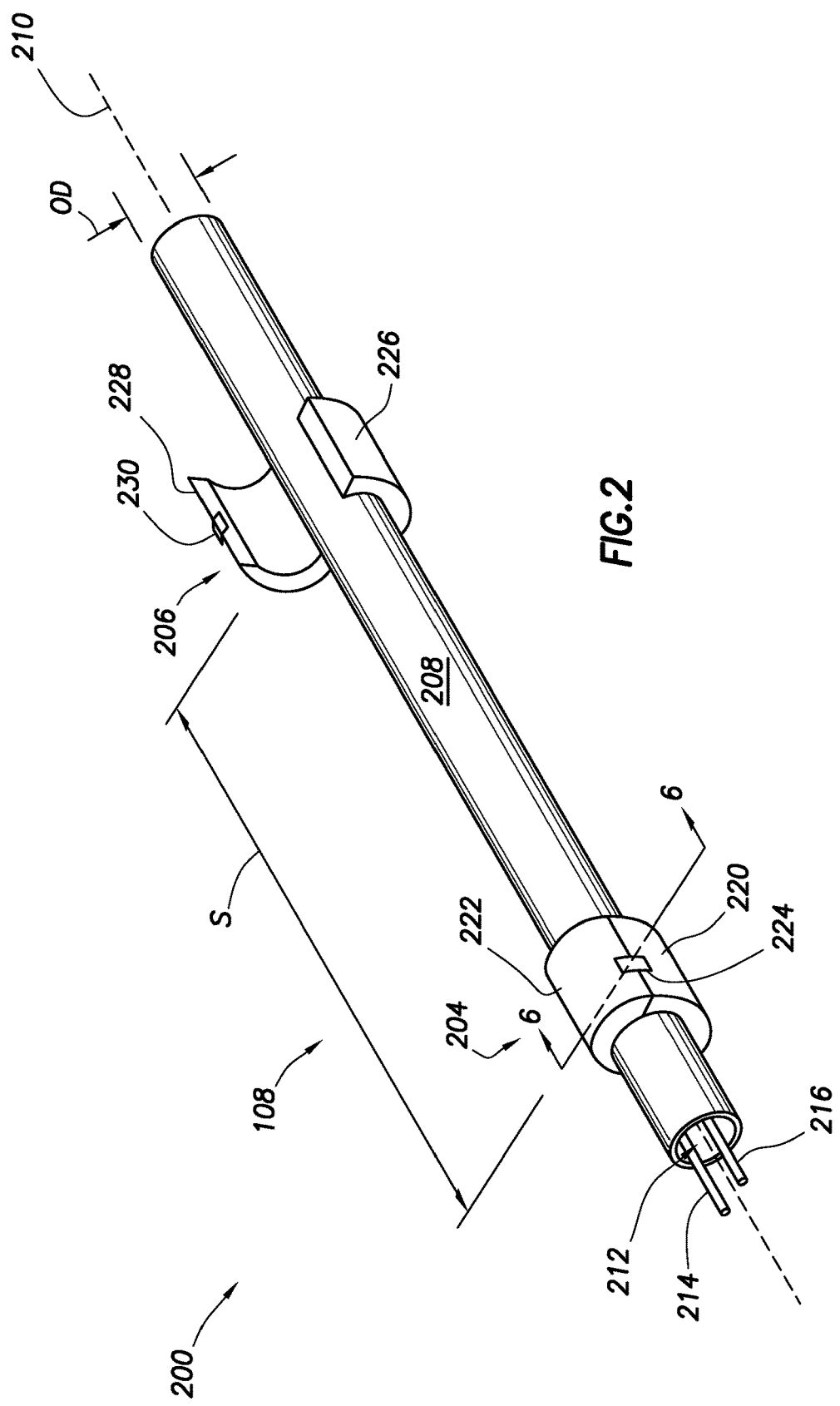
FIG. 2 shows a perspective cut-away view of a sensor cable and attached sensor modules in accordance with at least some embodiments.

The problems noted above are addressed, at least in part, by a system where sensor modules may be coupled to a sensor cable at any location along an extended axial length of the sensor cable without requiring discontinuities in the outer jacket of the sensor cable. That is, the sensor modules couple to the sensor cable without using connectors. FIG. 2 shows a perspective view of a portion of a geophysical system 200 in accordance with at least some embodiments. In particular, FIG. 2 shows a sensor cable 108, as well as two sensor modules 204 and 206. Sensor module 204 is shown fully coupled to the sensor cable 108, while sensor module 206 is shown partially coupled to the sensor cable 108 to show an example system.

The sensor cable 108 comprises an elongated outer jacket 208. The example outer jacket 208 may take any suitable form. In one example system, the elongated outer jacket 208 is flexible and constructed of polyurethane, but other watertight polymeric and non-magnetic substances may also be used. The outer jacket 208 defines a central axis 210 along the long dimension of the outer jacket. In some example systems the sensor cable 108 may be several kilometers in length, and thus the outer jacket 208 may have a similar length. The outer jacket 208 defines an interior volume 212. Within the interior volume 212 resides one more electrical conductor, and example systems may comprise two electrical conductors 214 and 216. As illustrated, the electrical conductors may be disposed on opposite sides of the interior volume 212, but such placement is not strictly required. Other devices and/or components may likewise reside within the interior volume (e.g., strength members) as well as devices to enable the relative placement of the electrical conductors 214 and 216, but the additional devices are not shown in FIG. 2 so as not to unduly complicate the figure. The outer jacket also defines an outside diameter (OD), and where the outside diameter is uniform not only at the locations where the example sensor modules 204 and 206 are coupled, but also between the sensor modules and beyond.

In addition to the electrical conductors 214 and 216 (and possibly strength members), the interior volume 212 may be filled with a substantially non-compressible substance such that the sensor cable 108 retains its shape at depth within the marine environment. In example systems the interior volume 212 may be filled with a water- or petroleum-based liquid, or a water- or petroleum based gel. Inasmuch as the sensor cable is to be deployed on the sea floor, the sensor cable 108 may be negatively buoyant, and the substance within the interior volume 212 may thus be selected to achieve particular buoyancy.

Still referring to FIG. 2, sensor module 204 is shown coupled to the sensor cable 108, and in particular coupled such that the sensor module 204 abuts and circumscribes the outer jacket 208. The example sensor module 204 comprises a base portion 220 and a lid portion 222. In some cases, the lid portion 222 may couple to the base portion by a hinge (not visible in FIG. 2) on one side, and may couple to the base portion 220 by way of a latch 224 disposed opposite the hinge. It is within the base portion 220 that various devices reside, such as the sensor and a control circuit coupled to the sensor (discussed more below).

The sensor module 206 may be of similar design and construction as sensor module 204. In the view of FIG. 2, however, sensor module 206 is shown in a configuration where the base portion 226 abuts the outer jacket 208, but where the lid portion 228 is in an open configuration. Mechanically coupling a sensor module (such as sensor module 206) may thus involve opening the lid portion 228 with respect to the base portion 226. While in the open configuration the base portion 226 (or, alternatively, the lid portion 228) may be placed in an abutting relationship with the outer jacket 208. Once the sensor module is at the desired axial location, the lid portion 228 may be closed and the latch 230 latched to the base portion 226. It is noted that while latch 230 is shown coupled to the lid portion, the latch 230 may also couple to the base portion, or the latch may comprises multiple components distributed among the lid portion 228 and the base portion 226. Furthermore, multiple latches may be used.

In accordance with example systems, a sensor module may be placed at substantially any location along the sensor cable 108. In the section of the sensor cable shown in FIG. 2, for example, the sensor modules may be placed at any location, and thus the spacing S may be set or adjusted for any particular geophysical survey without the need to obtain a different sensor cable 108. Moreover, the outer jacket 208 may be continuous for long distances in axial length (stated otherwise, a plurality of sensor modules may be placed over a continuous length of outer jacket), thus eliminating the need for connectors. Moreover, to the extent axial forces are carried along the sensor cable 108 (e.g., during deployment, during retrieval), the axial forces are not carried by the sensor modules, which may make the design and construction of the sensor modules cheaper and less expensive than sensor modules that must carry axial load imposed upon the sensor cable.

Figure 3:
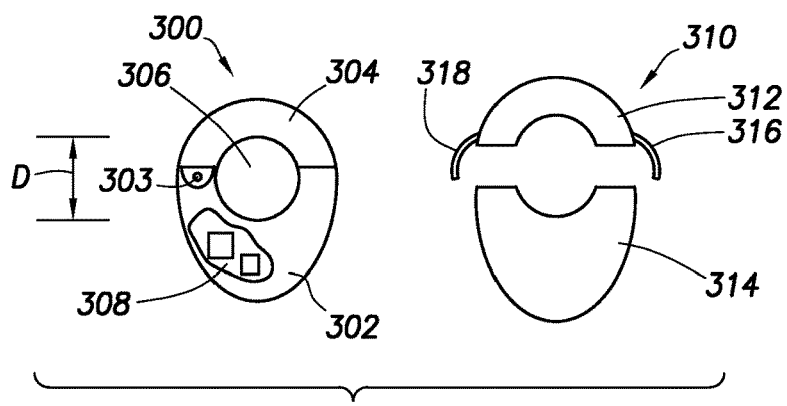
FIG. 3 shows side elevation, partial cut-away, views of a sensor module in accordance with at least some embodiments.

FIG. 3 shows a side elevation view of two separate sensor modules in accordance with further example systems. In particular, the left sensor module 300 comprises a base portion 302 and the lid portion 304, where the lid portion 304 is shown coupled to the base portion 302 by way of a hinge 303. In some situations, the base portion 302 and lid portion 304 may be referred to as a coupling member. The lid portion 304 and base portion 302 define a passage 306 through the sensor module, where the passage 306 defines an inside diameter configured to abut and circumscribe the outside diameter of a sensor cable (not shown in FIG. 3). The base portion 302 and lid portion 304 may be constructed of any suitable material, such as plastic material, metallic materials, and combinations. In accordance with example systems, the base portion 302 defines an interior volume 308 (shown in partial cutaway) within which various electrical components may reside, the electrical components discussed more below.

The right sensor module 310 of the FIG. 3 shows that, in other example systems, rather than the lid portion 312 being hinged to the base portion 314, the lid portion may be fully separable from the base portion 314. In these example systems, latches 316 and 318 on opposite sides of the lid portion 312, on opposite sides of the base portion 314, or both, may be used to couple the sensor module to the sensor cable at the desired axial location along the sensor cable 108.

The specification now turns to a discussion of the communicative coupling between the sensor modules (e.g., 110, 204, 206, 300, 310) and the electrical conductors (e.g., 214, 216) within the sensor cable 108. In the various example systems, the sensor modules may be placed at substantially any location along the sensor cable 108, and as described the outer jacket 208 may be continuous in the regions where the sensor modules connect. Thus, in the example systems control circuits and sensors within the sensor modules are electrically isolated from the electrical conductors disposed within the outer jacket 208 of the sensor cable 108. Nevertheless, the control circuits are communicatively coupled to one or more of the electrical conductors. More particularly, in example systems, each control circuit within each sensor module may be inductively coupled to the one or more of the electrical conductors 214 and 216 within the outer jacket 208 such that the control circuit can receive communications from a computer system controlling the geophysical survey.

Figure 4:
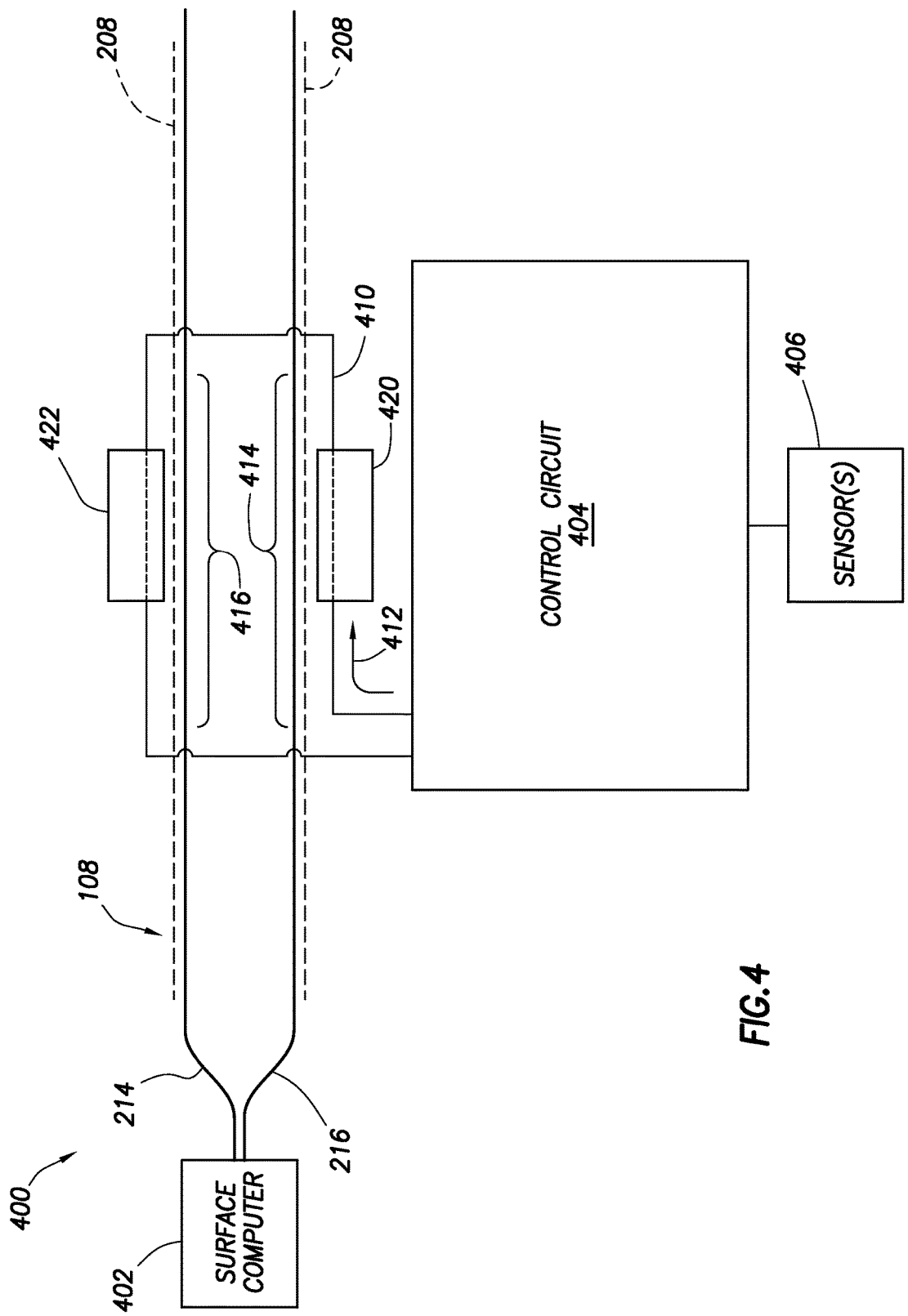
FIG. 4 shows a block diagram of a coupling system between the sensor cable and a sensor module in accordance with at least some embodiments.

FIG. 4 shows an electrical block diagram of an example system comprising a sensor module communicatively coupled to a sensor cable. In particular, FIG. 4 shows system 400 comprising a surface computer 402 communicatively coupled to the electrical conductors 214 and 216 of a sensor cable 108. In spite of the fact FIG. 4 is an electrical block diagram, in order to convey certain concepts the outer jacket 208 of the sensor cable 208 is shown in dashed lines. Thus, the electrical conductors 214 and 216 reside within the outer jacket 208, and are electrically coupled to the surface computer 402. FIG. 4 also shows various components associated with an example sensor module. In particular, FIG. 4 shows a control circuit 404 coupled to sensor 406. The sensor 406 is one or more sensors suitable for use in geophysical surveying. In one example system the sensor 406 is a hydrophone, which senses acoustic energy incident upon the sensor. In another example system the sensor 406 is a geophone, which senses movement (displacement) associated with acoustic energy incident upon the sensor. In yet still further example systems, the sensor 406 may be one or more accelerometers (e.g., a three-axis accelerometer), which sensor(s) sense acceleration associated with acoustic energy incident upon the sensor(s). In other example systems, the sensor 406 may be an electrode or magnetometer, which senses electromagnetic field amplitude and/or phase incident upon the sensor. In yet still other cases, a combination of two or more different types of sensors may be included in the sensors 406.

The one or more sensors 406 are communicatively coupled to the control circuit 404. In the example systems, the control circuit 404, upon command from the surface computer 402, reads data created by the sensor 406 and stores the data for later download. The control circuit 404 may also cease data collection upon the command of the surface computer 402, and further the control circuit may send portions or all the data to the surface computer over the sensor cable 108. For example, the control circuit 404 (discussed in greater detail below) may store the data collected by sensor 406 for download to the surface computer 402 (or some other computer system) once the sensor module within which the control circuit 404 is disposed has been retrieved to the surface. However, small portions of the data (sometimes referred to quality control (QC) data) may be sent to the surface computer 402 by the control circuit 404 during periods of time when the sensor module is located on the sea floor.

In the various example systems, the control circuit 404 communicates with the surface computer 402 over the one or more electrical conductors disposed within the sensor cable 108. More particularly, in the example systems the control circuit 404 and the computer system 402 are communicatively coupled in spite of the fact that the control circuit 404 is electrically isolated from the electrical conductors 214 and 216 by at least the outer jacket 208, the outer cover of the base portion, and in many cases insulation covering the electrical conductors 214 and 216 themselves. In the system of FIG. 4, the control circuit is coupled to an electrical conductor 410 that is located within the base portion of the sensor module, and arranged in such a way that the electrical conductor runs parallel to the at least one of the electrical conductors. As illustrated, in some cases the electrical conductor is arranged to extend parallel both to the electrical conductor 214 and the electrical conductor 216. The communicative coupling in the example systems is an inductive coupling system.

Inductive coupling is based, at least in part, on magnetic fields that surround a conductor in the presence of electrical current flow along the conductor. In particular, considering traditional electrical current flow (i.e., hole flow, with actual electron flow in the opposite direction), a magnetic field is created around an electrical conductor as characterized by the "right hand rule" (where the thumb indicates the direction of current flow, and the finger movement from an open-hand position to a closed-hand represented the direction of the magnetic field). Thus, electrical current flow along the conductor 410 in the direction indicated by arrow 412 produces a magnetic field. The magnetic field produced by the electrical current flow extends outward from the conductor 410. In the various embodiments, the electrical conductor 410 is positioned within sensor module such that the conductor is physically close (e.g., within 5 centimeters (cm), and in some cases within 2 cm) to an electrical conductor within the sensor cable 108. The proximity of the electrical conductor 410 to an electrical conductor within the sensor cable 108 enables the magnetic field created responsive to current flow in the conductor 410 to at least partially encompass the portion of the electrical conductor within the sensor cable 108 parallel to the conductor 410. In the example system of FIG. 4, portion 414 of electrical conductor 216 is parallel to the corresponding portion of electrical conductor 410, and thus the magnetic field created by electrical current flow in conductor 410 at least partially encompasses the portion 414 of electrical conductor 216.

A second aspect of the inductive coupling may comprise the phenomenon that an electrical current can be induced in an electrical conductor when the electrical conductor is exposed to a time varying magnetic field. Thus, in accordance with the example systems, communicative coupling from the control circuit 404 to the surface computer 402 may take place by a creation of time varying electrical current flow in the electrical conductor 410. The time varying electrical current flow thus creates a time varying magnetic field around the conductor, and because the portion 414 of the electrical conductor 216 is exposed to the time varying magnetic field, electrical currents are induced in the electrical conductor 216 proportional to the current flow in the conductor 410. The opposite is also true. That is, communicative coupling from the surface computer 402 to the control circuit 404 may take place by a creation of time varying electrical current flow in the electrical conductor 216 creating a time varying magnetic field around the conductor. Because the electrical conductor 410 is exposed to the time varying magnetic field, electrical currents are induced in the electrical conductor 410 proportional to the current flow in the conductor 216. Thus, two-way data communication may take place between the surface computer 402 and the control circuit 404 in spite of the fact that the control circuit 404 and computer system 402 are electrically isolated from one another.

The example system of FIG. 4 shows what may be referred to as a differential signaling system. That is, time varying electrical current flow (such as electrical current illustrated by line 412) in the electrical conductor 410 induces a corresponding current in the portion 414 of the electrical conductor 216. As the same current flows in the electrical conductor 410 proximate to portion 416 of the electrical conductor 214, an opposite current flow is induced in the electrical conductor 214. Thus, communicative signals from the control circuit 404 to the surface computer system 402 may be detected by sensing differences in current and/or voltages between the electrical conductors 214 and 216. Likewise, communicative signals from the surface computer 402 to the control circuit 404 may sent by inducing differential current and/or voltages between the electrical conductors 214 and 216. However, use of a differential signaling is only an example, and other systems are possible.

Figure 5:
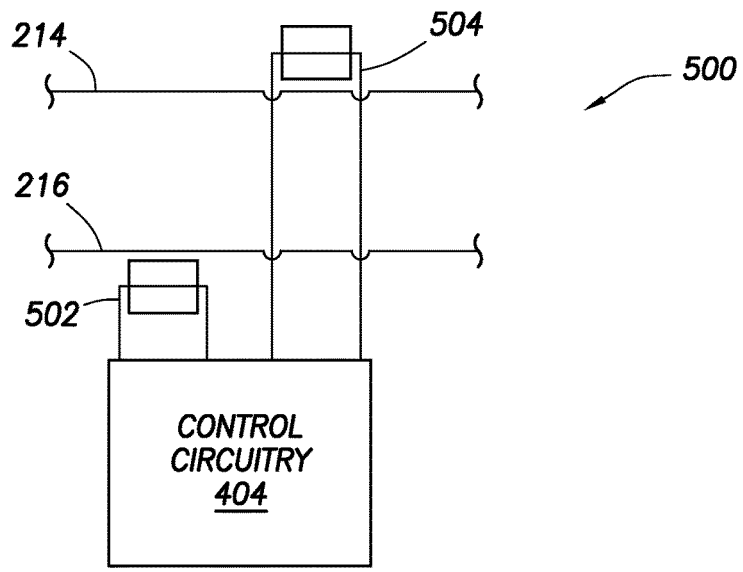
FIG. 5 shows a block diagram of a coupling system between the sensor cable and a sensor module in accordance with at least some embodiments view.

FIG. 5 shows an electrical block diagram of an alternate system of communicatively coupling the control circuit 404 to the electrical conductors 214 and 216. In particular, the system 500 of FIG. 5 comprises the control circuit 404, electrical conductor 502 (which runs parallel and proximate to the electrical conductor 216), as well as electrical conductor 504 (which runs parallel and proximate to the electrical conductor 214). Thus, in the example system the control circuit 404 may send and receive data communications over electrical conductor 216 by way of inductive coupling, and likewise send and receive data communications over electrical conductor 214 by way of inductive coupling. The communications over electrical conductor 214 need not be same, or even related to, the communications over electrical conductor 216. For example, the control circuit may send messages to the surface computer (not shown in FIG. 5) over the inductive coupling with the electrical conductor 216, and the control circuit may receive messages from the surface computer over the inductive coupling with electrical conductor 214. Further still, even if the sensor cable has two (or more) electrical conductors, it is not strictly required that the control circuit 404 be communicatively coupled to all the conductors in the sensor cable. For example, a sensor module may be arranged and constructed to be communicatively coupled to only one (or a small subset of) the electrical conductors within the sensor cable, such that one or dedicated groups of sensor modules are dedicate to particular communication pathways within the sensor cable.

Returning to FIG. 4, in some example systems having the electrical conductor 410 placed parallel to a portion of one or more electrical conductors within the sensor cable 108 may be sufficient to provide communicative coupling between the control circuit 404 and the surface computer system 402. However, in order to increase the coupling efficiency between the electrical conductors in the sensor module and electrical conductors within the sensor cable 108, in other example systems the electrical conductor 410 may be associated with one or more sets of magnetic material. In FIG. 4, the system 400 comprises a magnetic material 420 associated with electrical conductor 410 and portion 414 of the electrical conductor 216, and system 400 also comprises a magnetic material 422 associated with electrical conductor 410 and portion 416 of the electrical conductor 214. The sets of magnetic material may be any low reluctance material current available (e.g., stacks of thin sheets of metallic material such as used in the stators of electrical motors) or later-developed.

In non-magnetic media (such as air, plastics, free space), the magnetic field associated with electrical current flow in the electrical conductor 410 expands out a certain distance from the electrical conductor 410 (as a function of the field strength). However, in the presence of a magnetic material, the magnetic field attempts to confine itself to be predominantly within the magnetic material (again, as a function of field strength). In the example system of FIG. 4, and referring to magnetic material 420 for purposes of explanation, the electrical conductor 410 is situated such that the magnetic material 420 is disposed around the conductor 410. In some example systems, the electrical conductor may run through an aperture defined in the magnetic material 420. Of course, the magnetic material 420 is confined to the sensor module outer cover (e.g., the base portion). In regions where the magnetic material is present, the magnetic field created by electrical current flow within the electrical conductor 410 will tend to confine itself within the magnetic material, but then will expand out in regions lacking the magnetic material (i.e., the direction of the portion 414 of the electrical conductor 216). Thus, the magnetic material tends to focus or direct the magnetic field toward the portion 414 of the electrical conductor 216. The focusing or directing of the magnetic field increasing the inductive coupling between the conductor 410 and the portion 414 of the conductor 216. The focusing effect of the magnetic material 420 is likewise present in data communications from the surface computer system 402 along the electrical conductors within the sensor cable 108.

Figure 6:
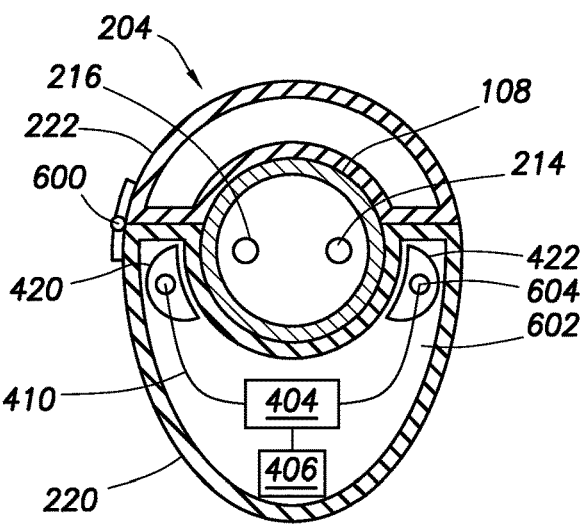
FIG. 6 shows a cut-away elevation view of a sensor module in accordance with at least some embodiments.

FIG. 6 shows a cross-sectional elevation view of the sensor cable and a sensor module, the view taken substantially along lines 6-6 of FIG. 2. In particular, FIG. 6 shows the example sensor module 204 comprising the base portion 220 and lid portion 222. In the example sensor module, the lid portion 222 couples to the base portion 220 by way of a hinge member 600 (where the axis of rotation about the hinge member 600 is perpendicular to the plane of the page). The base portion 220 defines an interior volume 602. Within the interior volume 602 are the control circuit 404, sensor 406, and electrical conductor 410. Also visible in FIG. 6 are cross-sectional views of the magnetic materials 420 and 422 disposed within the interior volume 602. In the example system, the electrical conductor 410 extends through apertures in the magnetic materials 420 and 422, such as aperture 604 associated with magnetic material 422. As discussed above, the magnetic materials 420 and 422 act to focus the magnetic fields created by the electrical conductor 410 toward respective electrical conductors 216 and 214. Likewise, the magnetic materials 420 and 422 focus magnetic fields created by the conductors 214 and 216 toward the electrical conductor 410.

Figure 7:
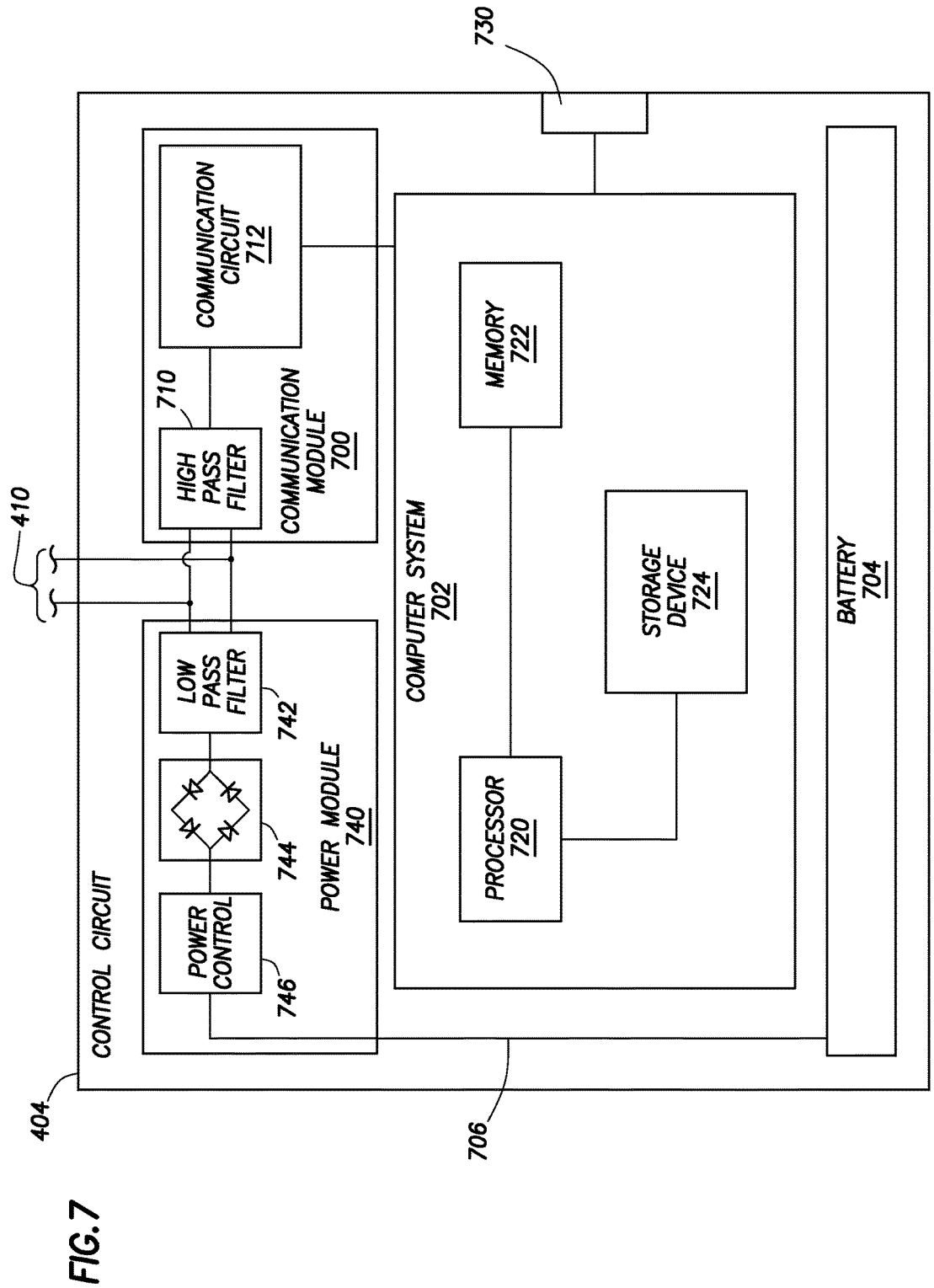
FIG. 7 shows a block diagram of a control circuit of a sensor module in accordance with at least some embodiments.

The specification now turns to an example electrical system which may be implemented within a sensor module. FIG. 7 shows an electrical block diagram of a control circuit of a sensor module in accordance with at least some embodiments. In particular, FIG. 7 shows that, in example systems, the control circuit 404 can be logically divided into a communication module 700, power module 740, a computer system 702, and a battery 704. Each will be discussed in turn, starting with the battery 704.

Battery 704 may be any suitable rechargeable battery or battery system configured to provide operational power to the other components of the control circuit 404, as well as to power the one or more sensors (the sensors not specifically shown in FIG. 7). In some cases, the battery 704 may power the various electrical components for extended periods of time (e.g., a month or more) during periods of time when a sensor module remains on the sea floor. That is, in cases where no power can be provided over the sensor cable 108, the battery 704 may provide operational power for multiple geophysical surveys taken over days or weeks. In other cases, the battery 704 may be charged by power extracted from the sensor cable, as illustrated by the electrical connection 706 between the power module 740 and the battery 704. The various electrical connections between the battery 704 and the other control circuit 404 devices which derive operational power from the battery 704 are not shown so as not to unduly complicate the figure.

The example control circuit 404 further comprises the communication module 700. As the name implies, the communication module 700 may be an interface between the computer system 702 and the electrical conductors of the sensor cable over which messages are exchanged with the surface computer. In the example system, and considering first messages received by the control circuit over the electrical conductor 410, the electrical conductor 410 illustratively couples to a high pass filter 710. The high pass filter may filter lower frequency signals (such as signals used to provide charge to the battery, discussed more below). The high pass filter 710 may implement other electrical features, such as impedance matching and signal amplification. The resultant signal from the high pass filter 710 couples to a communication circuit 712. The communication circuit 712 performs demodulation and/or decoding of the signals received over the sensor cable 108. The precise internal electrical structure of the communication module is dependent upon the type of modulation and communication system implemented across the sensor cable. For example, in some systems the modulation system may be an amplitude shift keying system where binary states are encoded in different amplitudes of a carrier frequency (e.g., off as one state, and on as a second state). In yet still other cases, the modulation system may be a frequency shift keying system wherein binary states are encoded in different frequencies (e.g., a first frequency representing a first binary state, and a second frequency representing a second binary state). Further still, example systems may use quadrature amplitude modulation (QAM) where the electrical conductors of the sensor cable simultaneously carry signals of different frequency, and wherein various possible states are encoded in the relationship of the two simultaneous signals. Regardless of the modulation system used, messages sent from the surface computer to the sensor module are demodulated and decoded by the communication circuit 712 and passed to the computer system 702.

Various types of messages may be sent from the surface computer to the computer system 702. For example, the surface computer may send a message for the computer system 702 to begin recording data from an attached sensor associated with the geophysical survey. Likewise, at some later time the surface computer may send a message to the sensor module to cease the collection of data from the attached sensor. Other example messages include time references.

With regard to time references, each sensor module 404 maintains a highly accurate time reference. In many cases the time reference is maintained by the computer system 702 responsive to a highly accurate crystal oscillator (not specifically shown). In order for geophysical data collected by all the sensor modules to be analyzed to identify parameters of an underground formation, a precise arrival time of the acoustic energy at each sensor module is noted. In order to initially align the time references across all the sensor modules coupled to a sensor cable, the surface computer may send one or more messages that include a time reference. The computer system 702 may thus receive a message with a time reference, and update the time reference of the control circuit 404 consistent with the message. Moreover, in some cases the sensor modules may remain on the sea floor for extended periods of time (e.g., a month or more), and thus even if each sensor module comprises a highly accurate time reference, over extended periods of time drift regarding current time may occur as between sensor modules. Again, the surface computer may address such issues by sending time references to the sensor modules (e.g., a broadcast message), and wherein each sensor module receives the message and corrects the current time to better align the time perceived by each sensor module.

Still referring to FIG. 7, the direction of message flow is not limited to just messages from the surface computer to the sensor module. In some systems, the control circuit 404, and in particular the communication module 700, may send messages to the surface computer over the sensor cable. The message range from acknowledgment messages (e.g., acknowledging a command to begin recording) to large messages with data payload directed to the surface computer. Consider, as an example, that the control circuit 404 in FIG. 7 has stored therein a large quantity of sensor data recorded during a geophysical survey operation. In some example systems, during the geophysical survey, after the geophysical survey, or both, the control circuit 404 may send the data to the surface computer over the sensor cable using any suitable modulation scheme. In some cases, all the data recorded by the control circuit 404 may be sent to the surface, while in other cases only a small portion may be sent for quality control purposes (i.e., QC data).

Turning now to the computer system 702 of the example control circuit 404. In some cases, the computer system 702 comprises processor 720 coupled to a memory 722. The processor 720 may be any currently available or after developed processor. The memory 722 may be the working memory for the processor 720, and from which instructions are executed. In some systems, the memory is an array of random access memory (RAM) devices. While in some systems the processor 720 and memory 722 may be individual components operatively coupled together, in one example system the processor 720 and memory 722 are an integrated component in the form of a low power microcontroller. The processor 720 may further couple to a long-term storage device 724. Storage device 724 may comprise any suitable long term non-volatile storage device or devices, such as an array of battery-backed RAM, or one or more flash memory devices. In example systems, the storage device 724 may be the location that stores instructions that enable the computer system 702, and thus the control electronics 404, to act as a sensor module in a geophysical survey system. Further, the storage device 724 may be the location within which sensor data recorded during a geophysical survey is stored until the data can be sent to the surface over the geophysical cable, and/or "downloaded" once the sensor module is retrieved to the surface.

In cases where sensor data is held within a sensor module until the sensor module is brought back to the surface, the control electronics 404 may further comprise a communication port 730 communicatively coupled to the computer system 702. In the non-submerged state, the communication port 730 may be accessible (e.g., by removal of one or more sealed access panels) so as to perform various tasks, such as downloading recorded sensor data from the storage device 724 and updating the computer system 702 software or firmware. The physical and electrical protocol implemented by the communication port 730 may take any suitable form, such as a Universal Serial Bus (USB) port or IEEE 1391 "FireWire" system.

Still referring to FIG. 7, in some example systems the battery 704 has sufficient energy storage capacity to power a sensor module over the course of one or more geophysical surveys. However, in other cases the battery 704 may need to be charged, or at least the charge supplemented, during periods of time when the sensor module is submerged. Thus, in accordance with other example systems, the control circuit 400 further comprises a power module 740. As the name implies, the power module 740 is designed and constructed to draw power from the sensor cable, and use the power to charge the battery 704. In one example system, the power module 740 comprises a low pass filter 742. For example, a power signal may be carried on the electrical conductors 214 and 216, with the power signal having a first frequency, while the data communications (either to or from the sensor module) may be encoded on signals having higher frequency or frequencies. The low pass filter 742 may thus extract the lower frequency signals induced on the conductor 410, and may provide other electrical properties, such as impedance matching. The example power signal that passes the low pass filter 742 may then be applied to a rectifier circuit 744, which converts the time varying current (i.e., alternating current (AC)) into a direct current (DC) signal. The DC signal produced by the rectifier circuit may then be applied to the power control circuit 746. The power control circuit 746 may provide any suitable adjustment or control to the power flow, such as voltage regulation, current flow control, and charge control (e.g., for automatic charge cut off).

The various embodiments discussed to this point have assumed a sensor cable with two electrical conductors, and that communications with all the sensor modules could be achieved over two electrical conductors. In some example systems, two conductors are sufficient (e.g., shorter sensor cables, or sensor cables to which a smaller number of sensor modules are attached). In other cases, however, the length of the sensor cable and/or the number of sensor modules coupled to the sensor cable may make communicating with each sensor module difficult. In some cases, additional electrical conductors within the outer jacket 208 may be included, with the sensor modules either designed to communicate with specific conductors within the sensor cable, or the radial position of the sensor modules adjusted such that each sensor module communicates with a specific electrical conductor or set of electrical conductors. In other cases, however, sensor cable is logically divided into smaller communication regions, where each region may have a plurality of sensor modules, and where a wide-band backbone communication system communicates with each logical region.

Figure 8:
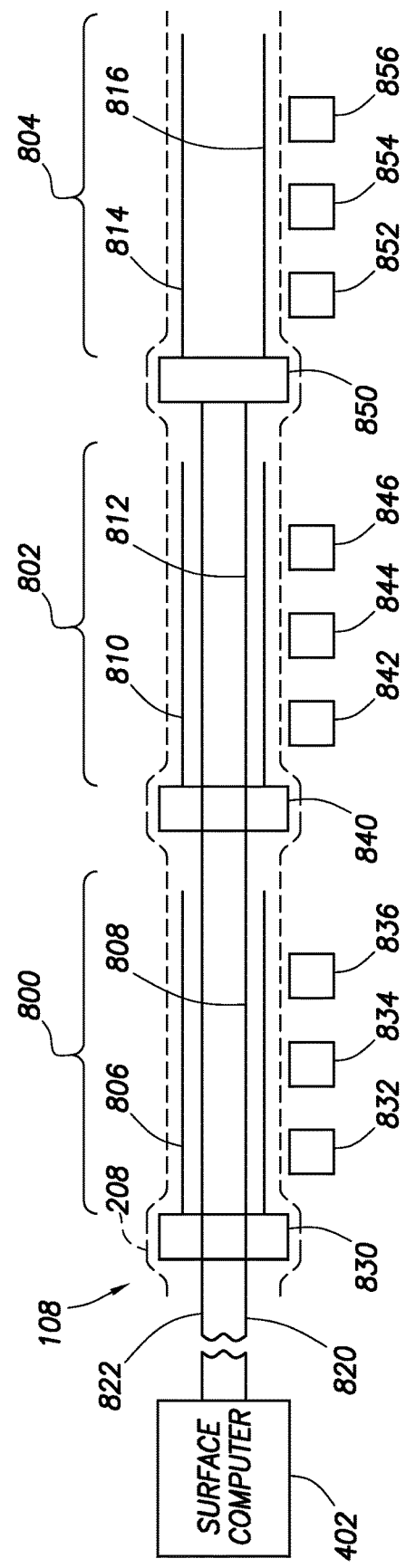
FIG. 8 shows a block diagram of an example system in accordance with at least some embodiments.

FIG. 8 shows, in block diagram form, an example system where the sensor cable is divided into logical regions. In particular, FIG. 8 shows a sensor cable 108 comprising the outer jacket 208 (the outer jacket shown in dashed lines). The sensor cable 108 is logically divided into a plurality of communication regions 800, 802, and 804. Within each communication region resides a plurality of electrical conductors. For example, within region 800 resides electrical conductors 806 and 808. Within region 802 resides electrical conductors 810 and 812. Finally, within region 804 resides electrical conductors 814 and 816. Thus, sensor cable portions discussed to this point (e.g., FIG. 2) could be a region within an overall sensor cable.

In addition to the electrical conductors within each region, the sensor cable 108 in FIG. 8 further comprises one or more electrical power conductors 820, and one or more back-bone communication channels 822. In one example embodiment, the back-bone communication channel 822 is one or more fiber optic cables, coaxial cable or cables, one more twisted pairs, or combinations thereof. As the name implies, the back-bone communication channel 822 in the example embodiments is main communication pathway to and from the surface computer 402. Each communication region extracts message traffic from the back-bone communication channel 822, and injects message traffic onto the back-bone communication channel 822 by way of a respective interface device. For example, interface device 830 may draw operational power from the electrical power conductors 820, and may provide the operational power on the conductors 806 and 808 to power the attached sensor modules 832, 834, and 836. The interface device 830 may extract message traffic from the back-bone communication channel destined for the sensor modules in the communication region 800, and may inject message traffic onto the back-bone communication channel 822 from the sensor modules in the communication region 800. Similarly, interface device 840 may draw operational power from the electrical power conductors 820, and may provide the operational power on the conductors 810 and 812 to power the attached sensor modules 842, 844, and 846. The interface device 840 may extract message traffic the back-bone communication channel destined for the sensor modules in the communication region 802, and may inject message traffic onto the back-bone communication channel 822 from the sensor modules in the communication region 802. Similarly, interface device 840 may draw operational power from the electrical power conductors 820, and may provide the operational power on the conductors 810 and 812 to power the attached sensor modules 842, 844, and 846. Finally, interface device 850 may draw operational power from the electrical power conductors 820, and may provide the operational power on the conductors 814 and 816 to power the attached sensor modules 852, 854, and 856. The interface device 850 may extract message traffic the back-bone communication pathway channel for the sensor modules in the communication region 802, and may inject message traffic onto the back-bone communication channel 822 from the sensor modules in the communication region 802.

Referring to communication region 800 as illustrative of all the communication regions, the interface device 830 may communicate on the back-bone communication channel using the communication protocol of the back-bone communication channel 822. For example, in situations where the back-bone communication channel 822 is a fiber optical channel, the surface computer and the interface devices may communication a synchronous optical networking (SONET) protocol. In yet still other example cases, the back-bone communication channel 822 may be dedicated point-to-point system (i.e., computer system 402 to each interface device 830, 840, and 850 over separate channels). In one example system, the separate channels may each be an Ethernet protocol systems over copper.

Regardless of the type of physical system and protocol implement on the back-bone communication channel 822, the interface device 830 may provide protocol translation and message packet transfers to and from the sensor modules within the example communication region 800. On the electrical conductor 806 and 808 side, any suitable communication system and protocol may be used. For example, the communications between the interface device 830 and the sensor modules 832, 834, and 836 may implement a modified token ring network, where each sensor module communicates only when the sensor modules receives the virtual token granting broadcast permission. In other cases, a time-division multiplexing scheme may be used to assign time windows within which each sensor module may broadcast messages.

Regardless of the precise protocol, logically dividing the sensor cable into communications regions may facilitate better two-way communications between the surface computer 402 and the sensor modules. It is noted that the example interface devices 830, 840, and 850 may be physically too large to reside within the outer jacket 208 in some cases. Thus, in some example systems, the interface devices may be coupled within the sensor cable 108 periodically (e.g., one every kilometer) by way of wet-connectors, thus establishing each communication region.

Figure 9:
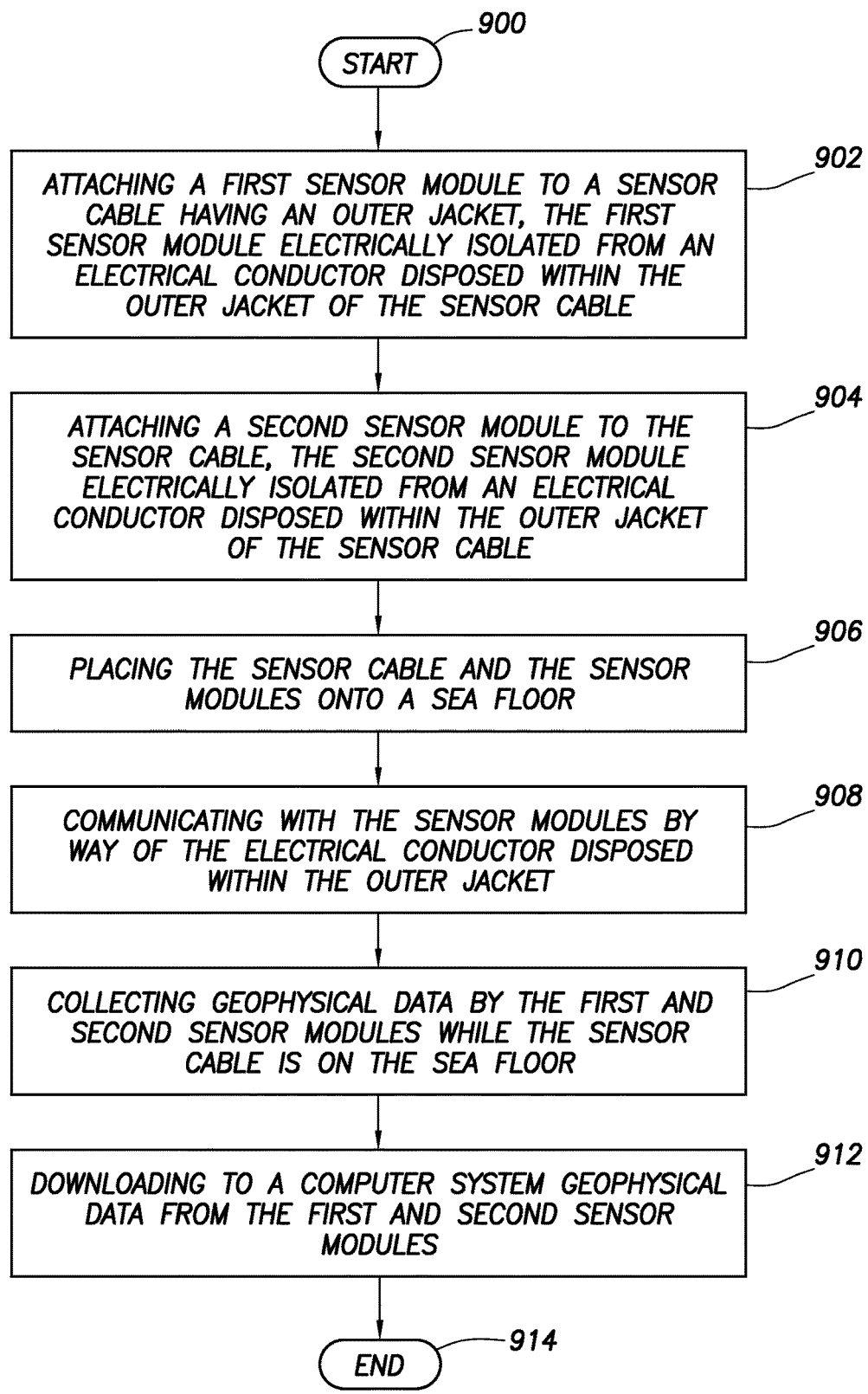
FIG. 9 shows a method in accordance with at least some embodiments.

FIG. 9 shows a method in accordance with at least some embodiments. In particular, the method starts (block 900) and comprises attaching a first sensor module to a sensor cable having an outer jacket, the first sensor module electrically isolated from an electrical conductor disposed within the outer jacket of the sensor cable (block 902). For example, the attaching may comprise attaching a sensor module such as shown in FIG. 2 to the sensor cable by a "clam-shell" mechanism. The method may then include attaching a second sensor module to the sensor cable, the second sensor module electrically isolated from an electrical conductor disposed within the outer jacket of the sensor cable (block 904). Either after attaching the various sensor modules, or contemporaneously with the attaching of the sensor modules, the method may include placing the sensor cable and the sensor modules onto a sea floor (block 906). For example, after a sensor module is attached on the deck of the work vessel 112, the sensor cable 108 may be fed into the water. Thereafter, the method may comprise: communicating with the sensor modules by way of the electrical conductor disposed within the outer jacket (block 908); collecting geophysical data by the first and second sensor modules while the sensor cable is on the sea floor (block 910); and downloading to a computer system geophysical data from the first and second sensor modules (block 912). The downloading may take place while the sensor modules are on the sea floor (e.g., over the electrical conductors of the sensor cable), or the downloading may take place once each sensor module is brought back to the surface (e.g., through the communication port 730). Thereafter the method ends (block 912), in some cases to be restarted at the next geophysical survey.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, in cases where only a single conductor is disposed within the sensor cable 108, the water outside the sensor cable may be used as a return path for electrical current. It is intended that the following claims be interpreted to embrace all such variations and modifications.

What is claimed is:

1. A system comprising:
   a sensor cable comprising:
      an outer jacket, the outer jacket defining an interior volume; and
      a first electrical conductor disposed within the interior volume, the first electrical conductor having an axial length along a length of the sensor cable;
   a first sensor module comprising:
      a coupling member configured to be releasably coupled to the outer jacket of the sensor cable;
      a sensor coupled to the coupling member; and
      a control circuit communicatively coupled to the sensor, the control circuit configured to be electrically isolated from the first electrical conductor, and the control circuit configured to be communicatively coupled to the first electrical conductor when the coupling member is coupled to the outer jacket;
   a second sensor module placed at a first location along the axial length of the first electrical conductor and a third sensor module placed at a second location along the axial length of the first electrical conductor, the second location spaced apart from the first location; and
   the first sensor module configured to be placed at any location along the axial length of the first electrical conductor between the second and third sensor modules.

2. The system of claim 1 wherein the coupling member further comprises:
   a base portion;
   a lid portion;
   a latch member configured to couple the lid portion to the base portion; and
   a passage through the first sensor module defined by the base portion and lid portion, the passage defining an inside diameter configured to mate with an outside diameter of the outer jacket;
   wherein the coupling member is configured to abut the outer jacket of the sensor cable.

3. The system of claim 2 wherein the coupling member is configured to circumscribe the outer jacket of the sensor cable.

4. The system of claim 2 wherein the coupling member further comprises a hinge coupled between the base portion and the lid portion, the hinge disposed opposite the latch member.

5. The system of claim 1 wherein the first sensor module further comprises:
   an interior volume defined by the first sensor module;
   a second electrical conductor disposed within the interior volume of the first sensor module; and
   a magnetic material disposed around the second electrical conductor within the interior volume of the first sensor module, the magnetic material configured to direct magnetic flux created around the second electrical conductor toward the first electrical conductor.

6. The system of claim 1 wherein the first sensor module further comprises:
   an interior volume;
   a second electrical conductor disposed within the interior volume of the first sensor module; and
   a magnetic material disposed around the second electrical conductor within the interior volume of the first sensor module, the magnetic material configured to direct magnetic field created around the first electrical conductor toward the second electrical conductor.

7. The system of claim 1:
   wherein the sensor cable further comprises a second electrical conductor disposed within the interior volume;
   wherein the first sensor module further comprises:
      an interior volume;
      a third electrical conductor disposed within the interior volume of the first sensor module;
      a first magnetic material disposed around the third electrical conductor within the interior volume of the first sensor module, the first magnetic material configured to direct magnetic flux created around the third electrical conductor toward the first electrical conductor;
      a fourth electrical conductor disposed within the interior volume of the first sensor module; and
      a second magnetic material disposed around the fourth electrical conductor within the interior volume of the first sensor module, the second magnetic material configured to direct magnetic flux created around the fourth electrical conductor toward the second electrical conductor.

8. The system of claim 1 wherein the control circuit further comprises:
   a communication module configured to exchange data communication with the first electrical conductor;
   a processor coupled to the communication module;
   a memory coupled to the processor;
   wherein the memory storing a program that, when executed by the processor, causes the processor to:
      begin collecting and storing data from the sensor upon a first command communicated along the first electrical conductor and received from the communication module; and
      cease collecting data from the sensor upon a second command communicated along the first electrical conductor and received from the communication module.

9. The system of claim 1 wherein the control circuit further comprises:
   a communication module configured to exchange data communication with the first electrical conductor;
   a processor coupled to the communication module;
   a memory coupled to the processor;
   wherein the memory storing a program that, when executed by the processor, causes the processor to:
      receive a time reference, the time reference communicated along the first electrical conductor and received from the communication module; and
      update a time reference maintained by the control circuit.

10. The system of claim 1 wherein the control circuit further comprises:
    a communication module configured to exchange data communication with the first electrical conductor;
    a processor coupled to the communication module;
    a memory coupled to the processor;
    wherein the memory storing a program that, when executed by the processor, causes the processor to send portions of data collected from the sensor through the communication module, the sending along the first electrical conductor.

11. The system of claim 1 further comprising a communication port coupled to the control circuit, the first sensor module configured to enable access to the communication port when the first sensor module is in a non-submerged state.

12. The system of claim 1 wherein the sensor comprises at least one sensor selected from the group consisting of: geophones, hydrophones, accelerometers, electrodes, magnetometers, and any combination thereof.

13. A sensor module comprising:
a base portion configured to be releasably coupled to an outer jacket of a sensor cable, the base portion defining an interior volume;
a sensor disposed within the interior volume;
a passage defined, at least in part, by the base portion, the passage defining an inside diameter configured to mate with an outside diameter of the outer jacket;
a control circuit communicatively coupled to the sensor, the control circuit configured to be electrically isolated from electrical conductors of the sensor cable, and the control circuit configured to be communicatively coupled to at least one electrical conductor within the sensor cable when the base portion is coupled to the outer jacket; and
a first electrical conductor disposed within the interior volume, the first electrical conductor extends along a straight central axis, wherein the straight central axis is parallel to the at least one electrical conductor within the sensor cable when the base portion is coupled to the outer jacket;
wherein the control circuit further comprises:
a communication module configured to exchange data communication with an electrical conductor within the sensor cable;
a processor coupled to the communication module;
a memory coupled to the processor;
wherein the memory storing a program that, when executed by the processor, causes the processor to:
receive a time reference, the time reference communicated along the electrical conductor of the sensor cable and received from the communication module; and
update a time reference maintained by the control circuit.

14. The sensor module of claim 13 further comprising:
a lid portion; and
a latch member configured to couple the lid portion to the base portion;
wherein the base portion and lid portion are configured to circumscribe the outer jacket of the sensor cable.

15. The sensor module of claim 13, further comprising:
a magnetic material disposed around the first electrical conductor within the interior volume, the magnetic material configured to direct magnetic flux created around the first electrical conductor toward an electrical conductor within the sensor cable.

16. The sensor module of claim 13, further comprising:
a magnetic material disposed around the first electrical conductor within the interior volume, the magnetic material configured to direct magnetic field created around the first electrical conductor toward an electrical conductor within the sensor cable.

17. The sensor module of claim 13 wherein the control circuit further comprises:
a communication module configured to exchange data communications with an electrical conductor within the sensor cable;
a processor coupled to the communication module;
a memory coupled to the processor;
wherein the memory storing a program that, when executed by the processor, causes the processor to:
begin collecting and storing data from the sensor upon a first command communicated along the electrical conductor of the sensor cable and received from the communication module; and
cease collecting data from the sensor upon a second command communicated along the electrical conductor of the sensor cable and received from the communication module.

18. The sensor module of claim 13 wherein the control circuit further comprises:
a communication module configured to exchange data communication with an electrical conductor of the sensor cable;
a processor coupled to the communication module;
a memory coupled to the processor;
wherein the memory storing a program that, when executed by the processor, causes the processor to send portions of data collected from the sensor through the communication module, the sending along the electrical conductor of the sensor cable.

19. The sensor module of claim 13 further comprising a communication port coupled to the control circuit, the base portion configured to enable access to the communication port when the sensor module is in a non-submerged state.

20. The sensor module of claim 13 wherein the sensor comprises at least one sensor selected from the group consisting of: geophones, hydrophones, accelerometers, electrodes, magnetometers, and any combination thereof.

* * * * *